United States Patent
Dixon

(10) Patent No.: US 11,441,929 B2
(45) Date of Patent: Sep. 13, 2022

(54) FLUID LEVEL SENSING SYSTEM AND METHOD

(71) Applicant: James Matthew Dixon, Sylvania, OH (US)

(72) Inventor: James Matthew Dixon, Sylvania, OH (US)

(73) Assignee: OBD MAX, INC., Sylvania, OH (US)

( * ) Notice: Subject to any disclaimer, the term of this patent is extended or adjusted under 35 U.S.C. 154(b) by 667 days.

(21) Appl. No.: 16/523,436

(22) Filed: Jul. 26, 2019

(65) Prior Publication Data
US 2020/0033175 A1    Jan. 30, 2020

Related U.S. Application Data

(60) Provisional application No. 62/703,927, filed on Jul. 27, 2018.

(51) Int. Cl.
*G01F 1/00* (2022.01)
*G01F 23/00* (2022.01)

(52) U.S. Cl.
CPC .............. *G01F 1/007* (2013.01); *G01F 23/00* (2013.01); *G01F 23/0007* (2013.01)

(58) Field of Classification Search
CPC ...... G01F 1/007; G01F 23/00; G01F 23/0007; G01F 15/005; G01F 15/07; G01F 23/02; G01F 23/22
See application file for complete search history.

(56) References Cited

U.S. PATENT DOCUMENTS

| 7,104,422 | B2* | 9/2006 | DiLeo | B67D 1/1234 |
| | | | | 222/64 |
| 8,863,986 | B2* | 10/2014 | Randall, Jr. | G01F 11/284 |
| | | | | 222/64 |
| 10,655,997 | B2* | 5/2020 | Pathier | G01F 1/74 |

FOREIGN PATENT DOCUMENTS

| CN | 1527030 A | 9/2004 |
| CN | 101476916 A | 7/2009 |
| CN | 201852613 U | 6/2011 |
| CN | 103389145 A | 11/2013 |
| DE | 4112559 A1 | 10/1992 |
| DE | 102007011132 A1 | 9/2007 |
| DE | 102007012917 A1 | 9/2008 |

* cited by examiner

*Primary Examiner* — Justin N Olamit
(74) *Attorney, Agent, or Firm* — Shumaker, Loop & Kendrick, LLP; James D. Miller

(57) ABSTRACT

Systems and methods for sensing an amount of a liquid in a container are provided. A conduit is provided that has a length positioned relative to a portion of the container where a level of the liquid in the container changes when liquid is added to the container or liquid is removed from the container. The conduit is in fluid communication with the container to therefore allow an amount of the liquid to enter the conduit that is proportional to the amount of the liquid in the container. An outlet is provided along with a valve. The valve is in fluid communication with the conduit and the outlet, where the valve is selectable to allow the amount of liquid in the conduit to pass to the outlet, the amount of liquid passing to the outlet proportional to the amount of liquid in the container.

18 Claims, 3 Drawing Sheets

FLUID LEVEL SENSING SYSTEM AND METHOD

CROSS-REFERENCE TO RELATED APPLICATIONS

This application claims the benefit of U.S. Provisional Application No. 62/703,927, filed on Jul. 27, 2018. The entire disclosure of the above application is incorporated herein by reference.

FIELD

The present technology relates to systems and operation thereof in sensing or determining a level of a liquid in a container, including ways of determining a rate of liquid withdrawal from the container that improve accuracy and that can be used to diagnose the system for proper operation.

INTRODUCTION

This section provides background information related to the present disclosure which is not necessarily prior art.

Many ways exist for detecting a level of a liquid in a container; e.g., see various systems employing a force transducer, a pressure transducer, a dip tube and pressure transducer, an auxiliary column and float, and an ultrasonic transducer, as depicted in FIG. 1. Systems and methods for detecting a level of a liquid in a container can accordingly use a variety of sensor technologies. However, no matter what type of sensor technology is used in such systems and methods, the one or more sensors employed therein are typically placed in a fixed position relative to a structure of the container or the sensor/sensors move by some means (e.g., a float mechanism) in direct relationship to a liquid level. Sensing the level of a liquid volume that changes very little over time (e.g., due to slow withdrawal or consumption rates, a large container and/or liquid volume, etc.) can be difficult and can reduce accuracy in determining a rate at which the liquid level changes. What is more, a sensor failure indicating an incorrect liquid level (e.g., where a sensor or float is defective or stuck), can be difficult to monitor and detect.

Accordingly, there is a need for improved ways of sensing an amount of liquid in a container.

SUMMARY

The present technology includes articles of manufacture, systems, and processes that relate to accurately determining an amount of liquid in a container, including where the liquid level may change slowly or in small increments over time. It is therefore possible to determine the level and rate of consumption of a liquid in a container with increased accuracy, which can be used to determine a precise amount of liquid in the container available for mixing with an additive as well as diagnose the system for proper operation.

Systems for sensing an amount of a liquid in a container are provided that include a container, a conduit, an outlet, and a valve. The container is configured to hold the liquid. The conduit has a length positioned relative to a portion of the container where a level of the liquid in the container changes when liquid is added to the container or liquid is removed from the container. The conduit is in fluid communication with the container, thereby allowing an amount of the liquid to enter the conduit that is proportional to the amount of the liquid in the container. The valve is in fluid communication with the conduit and the outlet, where the valve is selectable to allow the amount of liquid in the conduit to pass to the outlet. The amount of liquid passing to the outlet is proportional to the amount of the liquid in the container.

Additional aspects of the present technology include the following. The valve can be in fluid communication with the container and the valve can be selectable to allow the conduit to be in fluid communication with the container to therefore allow an amount of the liquid to enter the conduit that is proportional to the amount of the liquid in the container. The valve can further be selectable to isolate the conduit from the container and can have the conduit in fluid communication with the outlet to therefore allow the amount of liquid in the conduit to pass to the outlet, where the amount of liquid passing to the outlet is proportional to the amount of the liquid in the container. Such systems can be operated by selecting with the valve to allow the amount of liquid in the conduit to pass to the outlet, where the amount of the liquid in the container can be determined in proportion to the amount of liquid passing through the outlet. One or more level sensors can be provided in the conduit or other volume reservoir smaller than the container that can be isolated as desired. When the liquid level or flow rate of the liquid in the container needs to be determined, the valve can be activated that isolates an amount of liquid proportional to the entire amount of liquid remaining in the container volume into an isolated measuring conduit. On-board detection can be used to monitor the level sensors for malfunction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
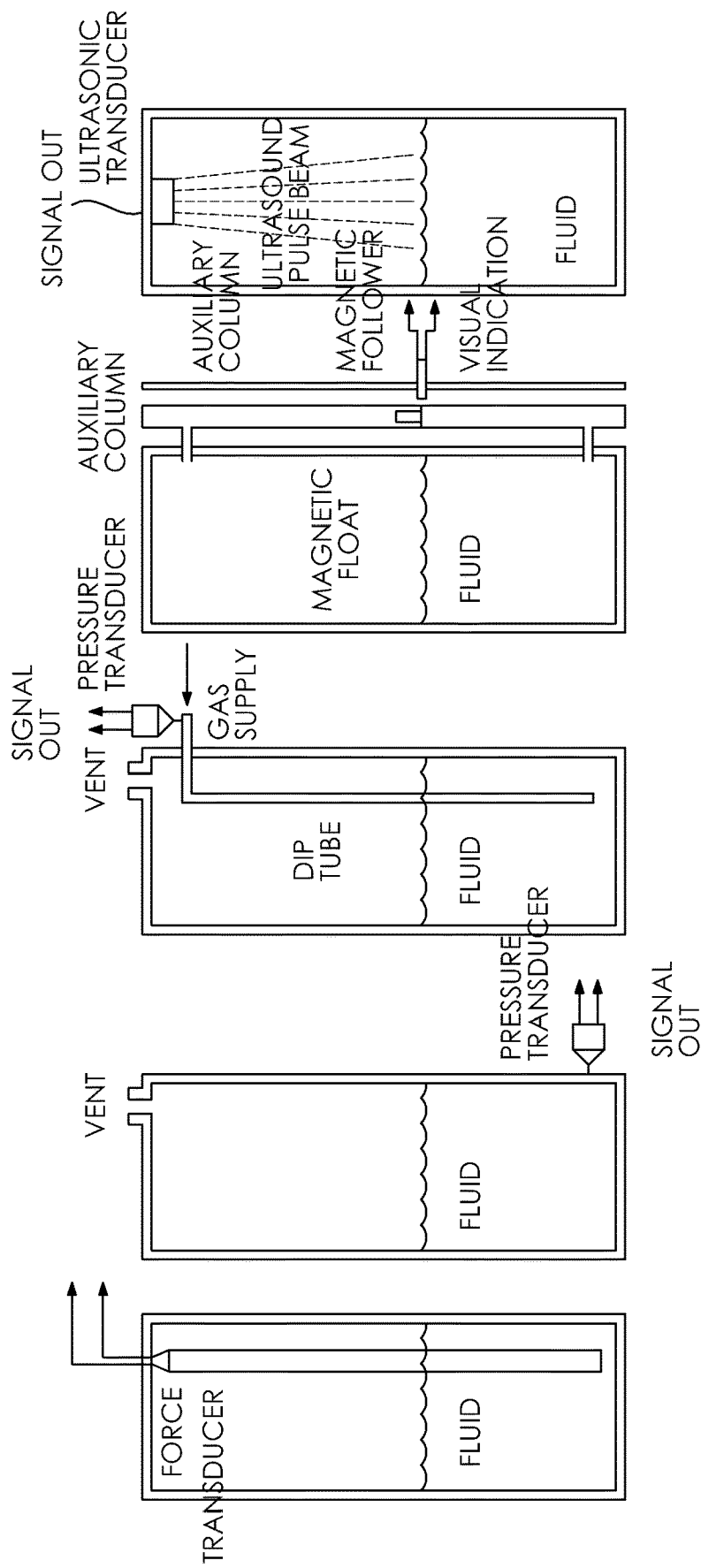
FIG. 1 shows various prior art embodiments of ways to detect a level of a liquid in a container.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides ways to accurately determine an amount of a liquid in a container, including ways to determine a rate of withdrawal or consumption of the liquid in the container. The present technology also provides means for monitoring one or more sensing means and detecting an error reported by one or more of the sensing means relative to the amount of liquid in the container. Certain embodiments of a system for sensing an amount of a liquid in a container include a container configured to hold the liquid, a conduit, an outlet, and a valve. The conduit can include a length positioned relative to a portion of the container where a level of the liquid in the container changes when liquid is added to the container or liquid is removed from the container. The conduit can be in fluid communication with the container thereby allowing an amount of the liquid to enter the conduit that is proportional to the amount of the liquid in the container. The valve can be in fluid communication with the conduit and the outlet. The valve can further be selectable to allow the amount of liquid in the conduit to pass to the outlet, where the amount of liquid passing to the outlet is proportional to the amount of the liquid in the container.

In this way, the present technology overcomes issues with existing liquid level measurement methods that rely on a vertical drop (e.g., change in liquid level height) of the entire container liquid volume to indicate a change in liquid level. When the container is large in relationship to the expected liquid level change over time (e.g., slow liquid consumption rate), accurate determination of level and consumption rate can be difficult. What is more, any monitoring for malfunction of one or more level sensors can be problematic.

The present technology can be used to quickly and accurately determine the amount of liquid remaining in a given container. When the liquid level remaining in the container needs to be determined, a valve can be activated that isolates an amount of liquid within a measuring conduit, where the amount of liquid in the isolated measuring conduit is proportional to the entire amount of liquid remaining in the container at the time of measurement. The measuring conduit, for example, has a known volume much smaller than the container itself. It is inside this measuring conduit that an accurate measurement of level and rate of consumption can be determined. As liquid is removed only from the measuring conduit, and not from the main container volume during consumption, the level in the measuring conduit drops much faster than any change in the level of the amount of liquid remaining in the container. This rapid level change can be accurately detected with various types of sensors positioned to read the liquid level in the measuring conduit. When a level sensor that indicates it is in contact with liquid changes state to indicate that it is no longer in contact with liquid, it is known that the liquid level is at the height of that level sensor, thereby allowing determination of an actual container liquid volume.

The present technology can also be used to quickly and accurately determine the rate of liquid consumption from the container. When the consumption rate needs to be determined, a valve can be activated that isolates an amount of liquid proportional to the entire amount of liquid remaining in the container volume present at time of measurement into the isolated measuring conduit. As liquid is removed only from the measuring conduit and not from the main container volume during consumption, the level in the measuring conduit drops quickly. This rapid level change can be accurately detected with various types of sensors positioned to read the liquid level in the measuring conduit. Knowing the volume of the measuring conduit and observing the time between changes in level sensor values located in the measuring conduit, the consumption rate can easily be determined.

The present technology can also be used to monitor the level sensors for malfunction. This can be particularly useful in on-board diagnostics (OBD) required for gasoline/diesel automobiles and trucks. When monitoring is desired, or optionally monitoring can be conducted during fluid level or consumption rate determinations, a valve can be activated that isolates an amount of liquid proportional to the entire amount of liquid remaining in the container volume present at time of malfunction monitoring into the isolated measuring conduit. As liquid is removed only from the isolated measuring conduit and not from the main container volume during consumption, or optionally the measuring liquid can be pumped directly back into the main container volume, the level in the measuring conduit drops quickly. This rapid level change can be accurately detected with various types of level sensors positioned to read the liquid level in the measuring conduit. During the removal of the liquid from the measuring conduit, it is expected that the value of the reading of the level sensors should change in relationship to the liquid being removed. If the change in level sensor readings does not match the expected change in value, a malfunction of the level sensor/sensors is suspected. Previous existing methods require long periods of time to check for expected level sensor value changes because of the large volume of liquid necessary to be consumed from the container before an expected change in level sensor values would occur.

At points where liquid is removed from a container, a controllable valve can be disposed where the liquid must pass through the valve to exit the container for normal use by the system or for a determination of the amount of liquid in the container, a consumption rate, or a level sensor monitoring. In certain embodiments, the valve can include two inlet ports, where a first port can be in fluid communication with the container and a second port can be in fluid communication with a measuring conduit. In certain embodiments, the valve can have an outlet port that is in fluid communication with an inlet port of a pump, thereby supplying the pump with the liquid for consumption, determination of amount of liquid in the container, and/or sensor monitoring. The valve can be controllable and can be selectable for flow paths between the various inlet/outlet ports depending on the desired function; e.g., level sensing, consumption rate, or level sensor monitoring.

During operation (e.g., non-measurement mode) the valve can be selected so that the pump can be supplied with liquid from the container through the valve, where the liquid can travel from a fluid connection between the container and the valve and can also travel through the measuring conduit to the valve. In such a configuration, the liquid in the main chamber of the container will be equalized in height with the liquid in the measuring conduit. This is a basis for the measuring conduit to have a fluid level proportional to the main container.

When it is desired to determine the liquid level or consumption rate or monitor the level sensors, the valve can be selected so that the measuring conduit is isolated from the main chamber of the container. The pump is now supplied with liquid only from the isolated measuring conduit. At this point, the volume of liquid in the isolated measuring conduit is proportional to the volume of liquid in the main container, but the total volume in the isolated measuring conduit is much smaller.

The volume of the measuring conduit is designed to reflect the expected amount of liquid to be consumed in a given time period under normal operation. This allows a relatively short period of pump operation to cause a large drop in liquid level height in the measuring conduit. The larger the change in liquid level per unit of time, the greater accuracy in measurement.

The following aspects can apply to the container used in the present systems and methods. The container can include an inlet configured for introducing the liquid into the container. For example, the container can be configured as a fuel tank, such as a diesel or gasoline fuel tank for a vehicle, electrical generator, or other liquid fuel consuming device. The fuel tank can include one or more filling ports as inlets as well as one or more outlets for distributing liquid fuel to various liquid fuel consuming devices or systems. The container can be made of metal, plastic, and/or composite and can be configured in various shapes and sizes depending on the desired application and/or to conform to particular specifications. A maximum liquid fill level and a minimum liquid fill or empty state can typically be determined and/or established for any given container of a particular size and shape.

The following aspects can apply to the valve used in the present systems and methods. The valve can be in fluid communication with the container and the valve can be selectable to allow the conduit to be in fluid communication with the container. In this way, an amount of the liquid can be allowed to enter the conduit that is proportional to the amount of the liquid in the container. It is understood that the allowing the liquid to enter the conduit can also include allowing the liquid to leave the conduit, where an equilibrium is established between the level and amount of liquid in the container and the level and amount of liquid in the conduit. This equilibrium can be maintained when liquid is added or withdrawn from the container so that the amount of liquid within the conduit remains proportional to the amount of the liquid in the container. The valve can also be selectable to isolate the conduit from the container and have the conduit in fluid communication with the outlet, thereby allowing the amount of liquid in the conduit to pass to the outlet, where the amount of liquid passing to the outlet is proportional to the amount of the liquid in the container. The valve can also be selectable to have the container in fluid communication with the outlet thereby allowing liquid within the container to pass to the outlet. In this way, for example, the outlet can be fluidly coupled to a liquid consumption device that draws the liquid from the container.

The following aspects can apply to the conduit used in the present systems and methods. The conduit can be of various sizes, shapes, cross-sections, bore diameters, lengths, etc. However, the conduit has a length thereof positioned relative to a portion of the container where a level of the liquid in the container changes when liquid is added to the container or liquid is removed from the container. That is, the length of the conduit can be positioned in a substantially vertical direction, whether directly vertical (e.g., parallel with gravity) or at an angle greater than zero relative to a horizontal direction (e.g., not perpendicular with gravity). Performance of the conduit can be optimized in some embodiments by having the conduit running substantially vertically relative to a portion of the container that has the greatest change in liquid level in response to the addition/removal of liquid therefrom.

In certain embodiments, the conduit can include a bleed hole that provides fluid communication between the conduit and the container. The bleed hole can therefore allow and/or facilitate establishment of an equilibrium between the level and amount of liquid in the container and the level and amount of liquid in the conduit. The bleed hole can also be configured relative to the conduit and system so that removal of liquid within the conduit (proportional to the amount of the liquid in the container) results in a minor or negligible amount liquid being simultaneously drawn through the bleed hole from the container. For example, the aperture size or diameter of the bleed hole can be much smaller than the cross-section or bore size of the conduit. Certain embodiments can include where the bleed hole is one quarter to one tenth the cross-sectional size of the conduit, still further embodiments include where the bleed hole is sized between one quarter to one twenty-fifth the cross-sectional size of the conduit. In this way, the liquid in the conduit can be directed to pass to the outlet (e.g., evacuated by pumping) much faster than the conduit can be refilled to equilibrium by liquid within the container. System and methods presented herein can further be calibrated to account for any additional liquid that passes from the container through the bleed hole into the conduit when the liquid present in the conduit is allowed to pass to the outlet. In this way, a corrected amount of liquid passing to the outlet can still be proportional to the amount of the liquid in the container and the amount of the liquid in the container can be determined.

The conduit can be configured in various ways, including where the length of the conduit is substantially linear and/or substantially vertical. The conduit can include a proximal end and a distal end, where the proximal end is fluidly coupled to the valve and the distal end is positioned above a maximum liquid fill level of the container. The conduit can further include one or more bends between the proximal end and the distal end. For example, the conduit can include a U-shaped bend between the proximal end and the distal end. Configuration of the conduit can be tailored relative to locations of the valve and/or the container of the system. Embodiments include where at least a majority of the conduit is disposed inside the container.

The following additional aspects can be included the present systems and methods. A pump can be included that is fluidly coupled to the outlet. The pump can be configured to draw the amount of liquid in the conduit through the outlet when the valve is selected to allow the amount of liquid in the conduit to pass to the outlet. The pump can be the same pump that supplies the liquid within the container to a device that consumes the liquid. A sensor can be included that is configured to measure the amount of liquid passing through the outlet when the valve is selected to allow the amount of liquid in the conduit to pass to the outlet. A processor can also be included where the processor is configured to determine the amount of the liquid in the container in proportion to the amount of liquid passing through the outlet when the valve is selected to allow the amount of liquid in the conduit to pass to the outlet. An additive reservoir can be further included, where the processor is configured to identify whether an amount of additive in the additive reservoir is sufficient to mix with the amount of liquid in the container at a predetermined ratio. For example, the additive reservoir can hold diesel exhaust fluid (e.g., an aqueous urea solution) and the container can be a diesel fuel tank, where it can be important to ascertain how much liquid diesel fuel remains in the fuel tank relative to the amount of diesel exhaust fluid in the additive reservoir. Fueling and operation of a diesel engine can therefore be optimized using the present technology by determining the amount of diesel fuel present and whether sufficient diesel exhaust fluid exists to treat emissions from burning the particular amount of diesel fuel.

Where the present technology includes both a pump and a sensor, the pump can be fluidly coupled to the outlet of the system. The pump can be further configured to draw the amount of liquid in the conduit through the outlet when the valve is selected to allow the amount of liquid in the conduit to pass to the outlet. The sensor can be configured to detect when the pump has completed drawing the amount of liquid in the conduit through the outlet when the valve is selected to allow the amount of liquid in the conduit to pass to the outlet. For example, the sensor can be a pressure sensor capable of determining the transition between liquid and gas, where such a transition can occur when the conduit is emptied of the amount of the liquid in the conduit (proportional to the amount of the liquid in the container). Based upon the pump rate and the liquid/gas transition point, the amount of liquid formerly contained in the conduit can be ascertained and in proportion the amount of liquid remaining in the container can be ascertained.

Embodiments of the conduit can include one or more level sensors configured to detect a level of the liquid within the conduit. As described, such level sensors can determine the level of the liquid within the conduit which is in proportion of the amount of liquid remaining in the container. The known volume of the conduit, the removal rate of liquid therefrom, and the fill level(s) obtained by the level sensors can be used to calculate the amount of liquid in the container, a rate of liquid consumption from the container, and whether one or more level sensors are operating correctly.

Various methods of sensing an amount of a liquid in a container can be employed using the systems described herein. In particular, such methods can include selecting with the valve to allow the amount of liquid in the conduit to pass to the outlet. Accordingly, the amount of the liquid in the container can be determined in proportion to the amount of liquid passing through the outlet. Further aspects of such methods of sensing an amount of liquid in a container include determining whether one or more level sensors are in contact with the amount of liquid in the conduit. The position of the one or more level sensors can determine a level and amount of liquid in the container. Subsequent contact and/or changes between level sensors representing changes in the amount of liquid in the conduit, is representative and proportional to changes in the amount of liquid in the container. For example, a fill rate and/or a consumption rate can be determined therefrom. Fill and/or consumption rates can be based upon a known volume of the conduit between level sensors and a time required to transition between the level sensor signals. This rate is proportional to the fill/consumption rate of the liquid in the container as the amount of fluid in a given length of the conduit, positioned relative to a portion of the container where a level of the liquid in the container changes when liquid is added to the container or liquid is removed from the container, is proportional to the amount of the liquid in the container.

Selecting the valve to allow the amount of liquid in the conduit to pass to the outlet, and determining the amount of the liquid in the container in proportion thereto, can also be used to confirm proper operation of the one or more level sensors. In certain embodiments, for example, the one or more level sensors can be used to continuously report an amount of the liquid with the container (in proportion to the liquid within the conduit), where at selected times, process points, and/or withdrawal or filling points of the liquid in the container, passing the amount of liquid in the conduit to the outlet, and determination of the proportion of the amount of liquid in the container therefrom, can be used to confirm proper operation of the one or more level sensors. Likewise, passing the amount of liquid in the conduit to the outlet, and determination of the proportion of the amount of liquid in the container therefrom, can be used to confirm proper operation of various other sensing means for sensing the amount of the liquid in the container; e.g., sensing means employing one or more level sensors, force transducers, pressure transducers, dip tubes and pressure transducers, auxiliary columns and floats, and ultrasonic transducers. Such sensing means can be located in other portions of the present systems, other portions of the container, within the container, as well as inlet and outlet supply lines.

EXAMPLES

Example embodiments of the present technology are provided with reference to the several figures enclosed herewith.

Figure 2:
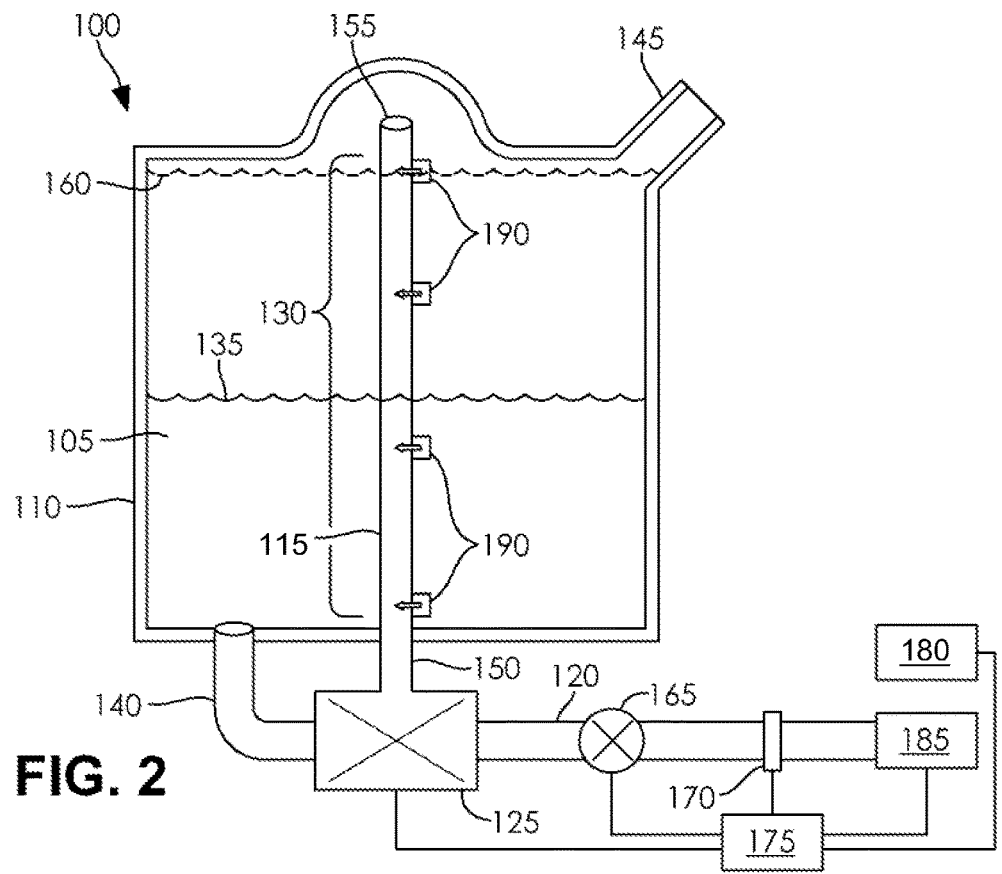
FIG. 2 shows a first embodiment of a system for sensing an amount of liquid in a container constructed in accordance with the present technology.

With reference to FIG. 2, a first embodiment of a system 100 for sensing an amount of a liquid 105 in a container 110 is shown, where the system 100 includes a container 110, a conduit 115, an outlet 120, and a valve 125. The container 110 is configured to hold the liquid 105. The conduit 115 has a length 130 positioned relative to a portion of the container 110 where a level 135 of the liquid 105 in the container 110 changes when liquid 105 is added to the container 110 or liquid 105 is removed from the container 110. The conduit 115 is in fluid communication with the container 110 thereby allowing an amount of the liquid 105 to enter the conduit 115 that is proportional to the amount of the liquid 105 in the container 110. The valve 125 is in fluid communication with the conduit 115 and the outlet 120, where the valve 125 is selectable to allow the amount of liquid 105 in the conduit 115 to pass to the outlet 120 and the amount of liquid 105 passing to the outlet 120 is proportional to the amount of the liquid 105 in the container 110. In the embodiment depicted in FIG. 2, the conduit 115 is in fluid communication with the container 110 through a supply port 140 fluidly coupled to the valve 125, where as described, the valve 125 is in fluid communication with the conduit 115.

The container 110 includes an inlet 145 configured for introducing the liquid 105 into the container 110. It should be noted that the same inlet 145 could be adapted to remove liquid 105 from the container 110, by introducing a tube or hose (not shown) therethrough to withdraw the liquid 105. The container 110 can also be configured with other inlets and outlets (not shown), where the container supplies and/or receives liquid 105 to multiple consumption devices or sources.

The valve 125 is in fluid communication with the container 110, via the supply port 140 in the embodiment shown in FIG. 2, and the valve 125 is selectable to allow the conduit 115 to be in fluid communication with the container 110 to thereby allowing an amount of the liquid 105 to enter the conduit 115 that is proportional to the amount of the liquid 105 in the container 110. The valve 125 is further selectable to isolate the conduit 115 from the container 110 (i.e., stop fluid communication between the conduit 115 and the container 110) and have the conduit 115 in fluid communication with the outlet 120. In this way, the valve 125 can be selected to allow the amount of liquid 105 in the conduit 115 to pass to the outlet 120 without allowing any liquid 105 to pass from the container 110 through the supply port 140 and valve 125 to the outlet 120. The amount of liquid 105 passing to the outlet 120 from the conduit 115 is proportional to the amount of the liquid 105 in the container 110.

The embodiment of the system 100 in FIG. 2 has the length 130 of the conduit 115 shown as substantially linear. However, it is recognized that various configurations of the conduit 115 can be employed, for example, where location or repositioning of the valve 125, shape of the container 110, as well as other system 100 parameters can require or permit other shapes and configurations of the conduit 115. The length 130 of the conduit 115 is also shown as substantially vertical, which can improve responsiveness of the sensing system to changes in liquid 105 level. The conduit 115 further includes a proximal end 150 and a distal end 155, where the proximal end 150 is fluidly coupled to the valve 125 and the distal end 155 is positioned above a maximum liquid fill level 160 of the container 110. The position of the distal end 155 in this manner can facilitate equilibration between the amount of liquid 105 within the container 110 and the amount of liquid 105 within the conduit 115, as gas or air above each is therefore common to each, and the amount of liquid 105 within the container 110 can be in fluid communication with the amount of liquid 105 within the conduit 115 via the supply port 140 and valve 125. Thus, the common gas or air pressure allows movement and equilibration of liquid 105 between the container 110 and conduit 115 when in fluid communication.

As further shown in FIG. 2, at least a majority of the conduit 115 is disposed inside the container 110; however, it is possible to have the conduit 115 run along the outside the container 110 or even be positioned remotely from the container 110, as long as the conduit 115 has the length 130 thereof positioned relative to a portion of the container 110 where a level of the liquid 105 in the container 110 changes when liquid 105 is added to the container 110 or liquid 105 is removed from the container 110. Placing the valve 125 at the bottom of the container 110 as shown in FIG. 2 allows gravity to equalize the liquid 105 in the conduit 115 with the liquid 105 in the container 110 and simplifies the design of the conduit 115.

The embodiment of the system 100 also includes a pump 165 fluidly coupled to the outlet 120. The pump 165 is configured to draw the amount of liquid 105 in the conduit 115 through the outlet 120 when the valve 125 is selected to allow the amount of liquid 105 in the conduit 115 to pass to the outlet 120. A sensor 170, which can be coupled to the outlet 120 as shown or integrated as part of the pump 165, is provided to measure the amount of liquid 105 passing through the outlet 120 when the valve 125 is selected to allow the amount of liquid 105 in the conduit 115 to pass to the outlet 120. For example, the sensor 170 can be a pressure sensor configured to detect a change from liquid 105 being drawn through the outlet 120 from the conduit 115 to when air or gas is drawn through the outlet 120 from the conduit 115.

The system 100 can further include a processor 175 configured to determine the amount of the liquid 105 in the container 110 in proportion to the amount of liquid 105 passing through the outlet 120 when the valve 125 is selected to allow the amount of liquid 105 in the conduit 115 to pass to the outlet 120. The processor 175 can be in communication with and/or control the pump 165 and the sensor 170. Based upon signals and operation of the pump 165 and the sensor 170, the processor can determine the amount of the liquid 105 in the container 110 using one or more predetermined or calibrated proportionality relationships between the volume of the conduit 115 and the volume of the container 110. As shown, the processor 175 can also be in communication with and/or control the valve 125, including the various selectable positions of the valve 125. The system 100 is also shown including an additive reservoir 180, where the processor 175 is configured to identify whether an amount of additive in the additive reservoir 180 is sufficient to mix with the amount of liquid 105 in the container 110 at a predetermined ratio. The processor 175, for example, can be in communication with and/or control operation of the additive reservoir 180, including dispensing of additive by the additive reservoir 180.

The system 100 as shown can include a liquid consumption device 185 that utilizes the liquid 105 within the container 110. In this regard, the valve 125 is selectable to have the container 110 in fluid communication with the outlet 120 thereby allowing liquid 105 within the container 110 to pass to the outlet 120 and onto the liquid consumption device 185. The valve 125, for example, can be selected to allow liquid 105 to pass from the container 110, through the supply port 140, valve 125, and outlet 120 onto the liquid consumption device 185. As such, the outlet 120 is fluidly coupled to the liquid consumption device 185. The processor 175 can also be in communication with and/or control aspects of operation of the liquid consumption device 185. One example configuration of the system 100 includes where the container 110 functions as a fuel tank, the liquid 105 is diesel fuel, the liquid consumption device 185 is a diesel engine, and the processor 175 controls and determines whether enough additive (e.g., diesel exhaust fluid) exists in the additive reservoir 180 and/or whether enough fuel exists in the container 110 for proper operation of the liquid consumption device 185.

The embodiment of the conduit 115 in the system 100 includes four level sensors 190, where each level sensor 190 is positioned to detect a particular level of the liquid 105 within the conduit 115. It is appreciated that different numbers, positioning, and spacing of level sensors 190 can be employed. The level sensors 190 can determine the level of the liquid 105 within the conduit 115 which is in proportion of the amount of liquid 105 remaining in the container 110. The known volume of the conduit 115, the removal rate of liquid 105 therefrom, and the fill level(s) obtained by the level sensors 190 can be used to calculate the amount of liquid 105 in the container 110, a rate of liquid consumption from the container 110, and whether one or more level sensors 190 are operating correctly, as described herein. It should be noted that one level sensor 190 is placed at the bottom of the conduit 115 that can be used to indicate when the liquid 105 is removed from the conduit 115; e.g., drawn out by the pump 165. The level sensors 190 can be in communication with the processor 175.

Figure 3:
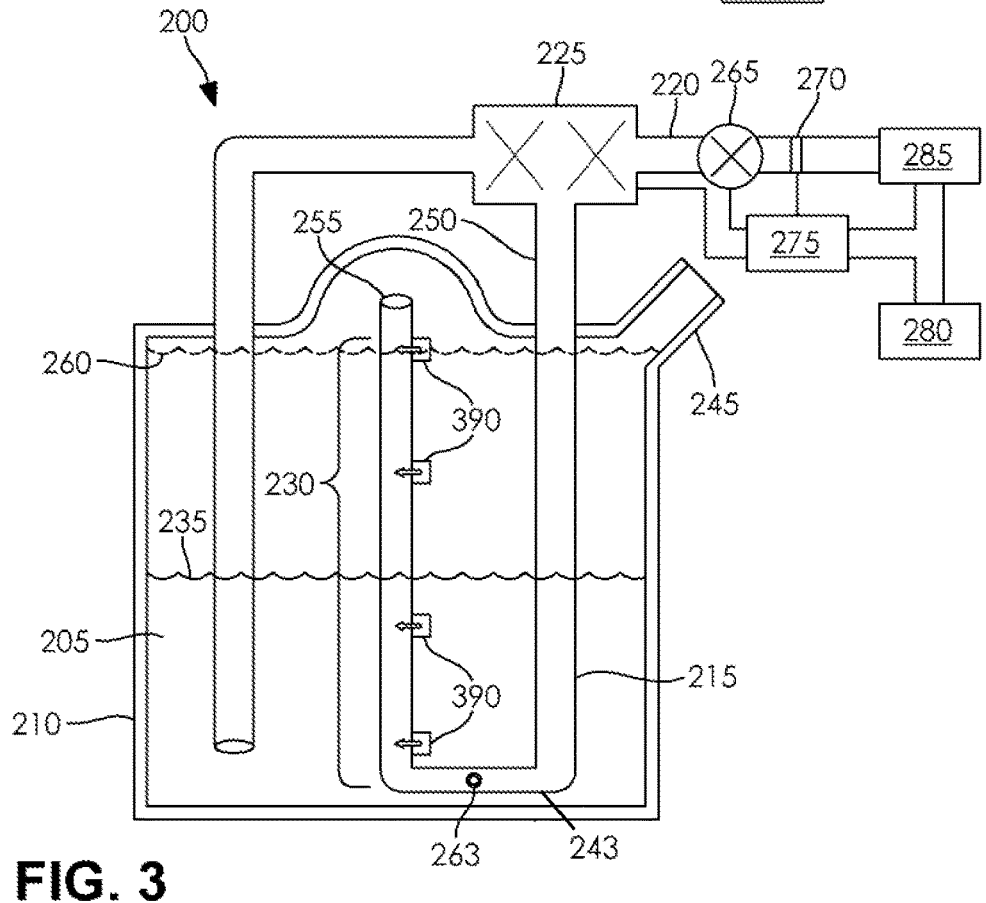
FIG. 3 shows a second embodiment of a system for sensing an amount of liquid in a container constructed in accordance with the present technology.

With reference to FIG. 3, a second embodiment of a system 200 for sensing an amount of a liquid 205 in a container 210 is shown, where the system 200 includes a container 210, a conduit 215, an outlet 220, and a valve 225. The container 210 is configured to hold the liquid 205. The conduit 215 has a length 230 positioned relative to a portion of the container 210 where a level 235 of the liquid 205 in the container 210 changes when liquid 205 is added to the container 210 or liquid 205 is removed from the container 210. The conduit 215 is in fluid communication with the container 210 thereby allowing an amount of the liquid 205 to enter the conduit 215 that is proportional to the amount of the liquid 205 in the container 210. The valve 225 is in fluid communication with the conduit 215 and the outlet 220, where the valve 225 is selectable to allow the amount of liquid 205 in the conduit 215 to pass to the outlet 220 and the amount of liquid 205 passing to the outlet 220 is proportional to the amount of the liquid 205 in the container 210. In the embodiment depicted in FIG. 3, the valve 225 can be in fluid communication with the container 210 through a supply port 240 fluidly coupled to the valve 225, where as described, the valve 225 can also be in fluid communication with the conduit 215. As can be seen, in the second embodiment of the system 200, the supply port 240 is directed downwards toward the bottom of the container 210, as the valve 225 is positioned above the container 210. Likewise, the conduit 215 includes a bend 243 between the proximal end and the distal end. The bend 243 allows the conduit 215 to run downwards from the valve 225 to the bottom of the container 210 and turn back upwards so that the length 230 of the conduit is positioned relative to a portion of the container 210 where a level 235 of the liquid 205 in the container 210 changes when liquid 205 is added to the container 210 or liquid 205 is removed from the container 210. The bend 243 in the embodiment depicted provides the conduit 215 with a U-shaped profile.

The container 210 includes an inlet 245 configured for introducing the liquid 205 into the container 210. It should be noted that the same inlet 245 could be adapted to remove liquid 205 from the container 210, by introducing a tube or hose (not shown) therethrough to withdraw the liquid 205. The container 210 can also be configured with other inlets and outlets (not shown), where the container supplies and/or receives liquid 205 to multiple consumption devices or sources.

The embodiment of the system 200 in FIG. 3 has the length 230 of the conduit 215 shown as substantially linear. However, it is recognized that various configurations of the conduit 215 can be employed, for example, where location or repositioning of the valve 225, shape of the container 210, as well as other system 200 parameters can require or permit other shapes and configurations of the conduit 215. The length 230 of the conduit 215 is also shown as substantially vertical, which can improve responsiveness of the sensing system to changes in liquid 205 level. The conduit 215 further includes a proximal end 250 and a distal end 255, where the proximal end 250 is fluidly coupled to the valve 225 and the distal end 255 is positioned above a maximum liquid fill level 260 of the container 210. The position of the distal end 255 in this manner can facilitate equilibration between the amount of liquid 205 within the container 210 and the amount of liquid 205 within the conduit 215, as gas or air above each is therefore common to each, and the amount of liquid 205 within the container 210 can be in fluid communication with the amount of liquid 205 within the conduit 215. Thus, the common gas or air pressure allows movement and equilibration of liquid 205 between the container 210 and conduit 215 when in fluid communication. The embodiment of the conduit 215 in the system 200 includes a bleed hole 263 that provides fluid communication between the conduit 215 and the container 210. The bleed hole 263 can further facilitate equilibration between the amount of liquid 205 within the container 210 and the amount of liquid 205 within the conduit 215. As described herein, the system 200 can further be calibrated to account for any additional liquid 205 that passes from the container 210 through the bleed hole 263 into the conduit 215 when the liquid 205 present in the conduit 215 is allowed to pass to the outlet 220. In this way, a corrected amount of liquid 205 passing to the outlet 220 can still be proportional to the amount of the liquid 205 in the container 210 and the amount of the liquid 205 in the container 210 can be determined.

As further shown in FIG. 3, at least a majority of the conduit 215 is disposed inside the container 210; however, it is possible to have a portion of the conduit 215 run along the outside the container 210 or even be positioned remotely from the container 210, as long as the conduit 215 has the length 230 thereof positioned relative to a portion of the container 210 where a level of the liquid 205 in the container 210 changes when liquid 205 is added to the container 210 or liquid 205 is removed from the container 210. In the embodiment shown, the portion of the conduit 215 having the bleed hole 263 needs to be in fluid communication with the liquid 205 inside the container 210. Placing the valve 225 at the top of the container 210 as in FIG. 3 also allows gravity to equalize the conduit 215 with the container 210, but the design of the conduit 215 provides a different configuration than the first embodiment of the system 100 shown in FIG. 2. The bend 243 allows for the looped conduit 215 configuration with the bleed hole 263 at the bottom of the loop or bend 243 of the U-shaped portion so that liquid 205 can equalize between the conduit 215 and the container 210, as shown in FIG. 3.

The embodiment of the system 200 also includes a pump 265 fluidly coupled to the outlet 220. The pump 265 is configured to draw the amount of liquid 205 in the conduit 215 through the outlet 220 when the valve 225 is selected to allow the amount of liquid 205 in the conduit 215 to pass to the outlet 220. A sensor 270, which can be coupled to the outlet 220 as shown or integrated as part of the pump 265, is provided to measure the amount of liquid 205 passing through the outlet 220 when the valve 225 is selected to allow the amount of liquid 205 in the conduit 215 to pass to the outlet 220. For example, the sensor 270 can be a pressure sensor configured to detect a change from liquid 205 being drawn through the outlet 220 from the conduit 215 to when air or gas is drawn through the outlet 220 from the conduit 215.

The system 200 can further include a processor 275 configured to determine the amount of the liquid 205 in the container 210 in proportion to the amount of liquid 205 passing through the outlet 220 when the valve 225 is selected to allow the amount of liquid 205 in the conduit 215 to pass to the outlet 220. The processor 275 can be in communication with and/or control the pump 265 and the sensor 270. Based upon signals and operation of the pump 265 and the sensor 270, the processor can determine the amount of the liquid 205 in the container 210 using one or more predetermined or calibrated proportionality relationships between the volume of the conduit 215 and the volume of the container 210. As shown, the processor 275 can also be in communication with and/or control the valve 225, including the various selectable positions of the valve 225. The system 200 is also shown including an additive reservoir 280, where the processor 275 is configured to identify whether an amount of additive in the additive reservoir 280 is sufficient to mix with the amount of liquid 205 in the container 210 at a predetermined ratio. The processor 275, for example, can be in communication with and/or control operation of the additive reservoir 280, including dispensing of additive by the additive reservoir 280.

The system 200 as shown can include a liquid consumption device 285 that utilizes the liquid 205 within the container 210. In this regard, the valve 225 is selectable to have the container 210 in fluid communication with the outlet 220 thereby allowing liquid 205 within the container 210 to pass to the outlet 220 and onto the liquid consumption device 285. The valve 225, for example, can be selected to allow liquid 205 to pass from the container 210, through the supply port 240, valve 225, and outlet 220 onto the liquid consumption device 285. As such, the outlet 220 is fluidly coupled to the liquid consumption device 285. The processor 275 can also be in communication with and/or control aspects of operation of the liquid consumption device 285. One example configuration of the system 200 includes where the container 210 functions as a fuel tank, the liquid 205 is diesel fuel, the liquid consumption device 285 is a diesel engine, and the processor 275 controls and determines whether enough additive (e.g., diesel exhaust fluid) exists in the additive reservoir 280 and/or whether enough fuel exists in the container 210 for proper operation of the liquid consumption device 285.

The embodiment of the conduit 215 in the system 200 includes four level sensors 290, where each level sensor 290 is positioned to detect a particular level of the liquid 205 within the conduit 215. It is appreciated that different numbers, positioning, and spacing of level sensors 290 can be employed. The level sensors 290 can determine the level of the liquid 205 within the conduit 215 which is in proportion of the amount of liquid 205 remaining in the container 210. The known volume of the conduit 215, the removal rate of liquid 205 therefrom, and the fill level(s) obtained by the level sensors 290 can be used to calculate the amount of liquid 205 in the container 210, a rate of liquid consumption from the container 210, and whether one or more level sensors 290 are operating correctly, as described herein. It should be noted that one level sensor 290 is placed at the bottom of the conduit 215 that can be used to indicate when the liquid 205 is removed from the conduit 215; e.g., drawn out by the pump 265. The level sensors 290 can be in communication with the processor 275.

Figure 4:
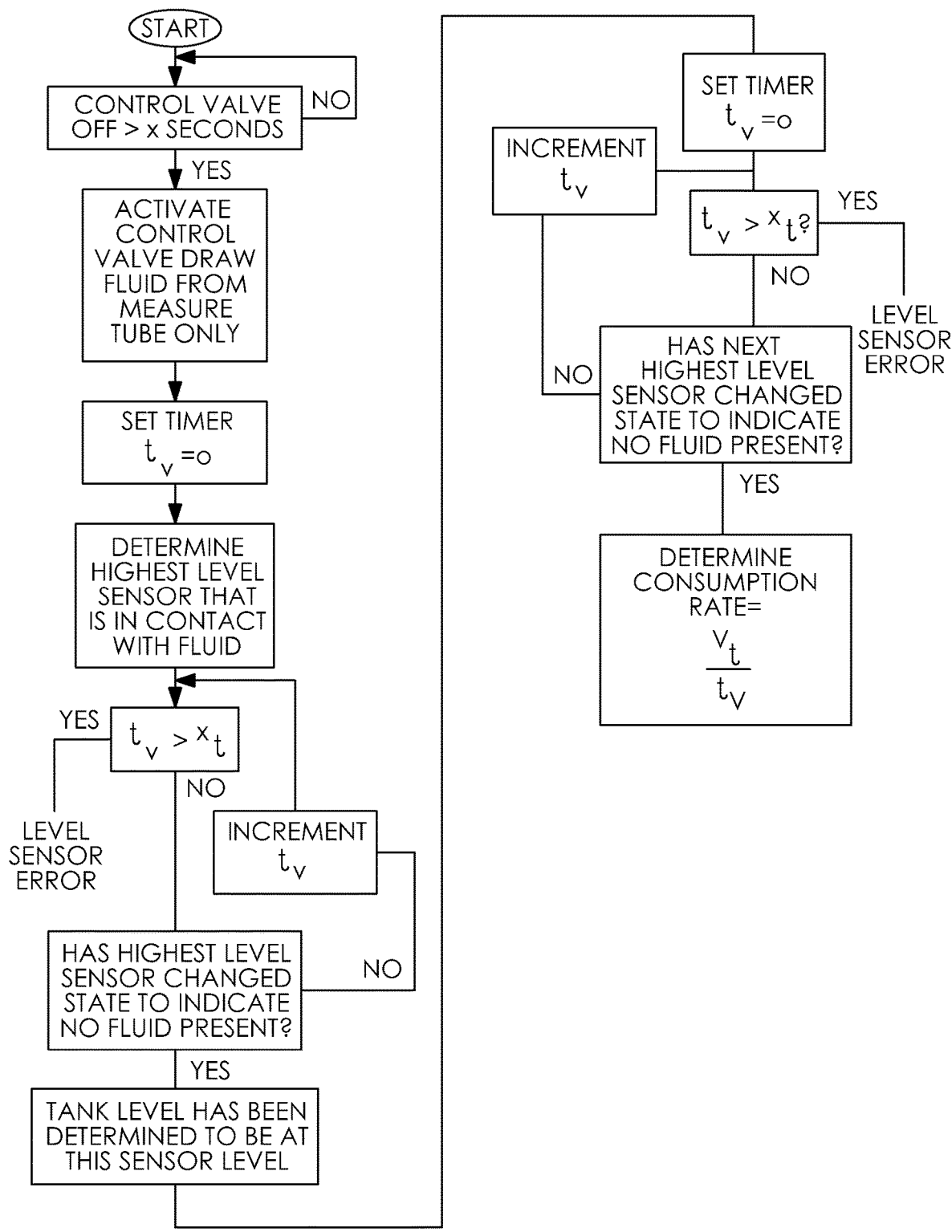
FIG. 4 is a flowchart depicting an embodiment of a method that can include determination of a fluid level, a rate of liquid consumption, and one or more level sensor malfunctions.

With reference to FIG. 4, a flow chart is shown that depicts aspects of an embodiment of a method of operating such systems for sensing an amount of a liquid in a container. The method can operate one of the systems 100, 200 described herein by selecting with the valve 125, 225 to allow the amount of liquid 105, 205 in the conduit 115, 215 to pass to the outlet 120, 220. The method can then determine the amount of the liquid 105, 205 in the container 110, 210 in proportion to the amount of liquid 105, 205 passing through the outlet 120, 220. Fill and/or consumption rates can be based upon a known volume of the conduit 115, 225 between level sensors 190, 290 and a time required to transition between the level sensor 190, 290 signals. This rate is proportional to the fill/consumption rate of the liquid 105, 205 in the container 110, 210 as the amount of liquid 105, 205 in a given length of the conduit 115, 215, positioned relative to a portion of the container 110, 210 where a level of the liquid 105, 205 in the container 110, 210 changes when liquid 105, 205 is added to the container 110, 210 or liquid 105, 205 is removed from the container 110, 210, is proportional to the amount of the liquid 105, 205 in the container 110, 210.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for sensing a first amount of a liquid in a container comprising:
 a container configured to hold the liquid;
 a conduit having a length positioned relative to a portion of the container where a level of the liquid in the container changes when liquid is added to the container or liquid is removed from the container, the conduit in fluid communication with the container thereby allowing a second amount of the liquid to enter the conduit that is proportional to the first amount of the liquid in the container;
 an outlet;
 a valve in fluid communication with the conduit and the outlet, wherein the valve is selectable to allow the second amount of liquid in the conduit to pass to the outlet, the second amount of liquid passing to the outlet being proportional to the first amount of the liquid in the container;
 a sensor configured to measure the second amount of liquid passing through the outlet when the valve is selected to allow the second amount of liquid to pass to the outlet; and
 a processor configured to determine the first amount of the liquid in the container based on the second amount of liquid measured by the sensor.

2. The system of claim 1, wherein the container includes an inlet configured for introducing the liquid into the container.

3. The system of claim 1, wherein the valve is in fluid communication with the container and the valve is selectable to allow the conduit to be in fluid communication with the container thereby allowing the second amount of the liquid to enter the conduit that is proportional to the first amount of the liquid in the container.

4. The system of claim 3, wherein the valve is selectable to isolate the conduit from the container and have the conduit in fluid communication with the outlet thereby allowing the second amount of liquid in the conduit to pass to the outlet, the second amount of liquid passing to the outlet being proportional to the first amount of the liquid in the container.

5. The system of claim 1, wherein the conduit includes a bleed hole providing fluid communication between the conduit and the container.

6. The system of claim 1, wherein the length of the conduit is substantially linear.

7. The system of claim 1, wherein the length of the conduit is substantially vertical.

8. The system of claim 1, wherein the conduit includes a proximal end and a distal end, the proximal end fluidly coupled to the valve, the distal end positioned above a maximum liquid fill level of the container.

9. The system of claim 8, wherein the conduit includes a bend between the proximal end and the distal end.

10. The system of claim 1, wherein at least a majority of the conduit is disposed inside the container.

11. The system of claim 1, further comprising a pump fluidly coupled to the outlet, the pump configured to draw the second amount of liquid in the conduit through the outlet when the valve is selected to allow second the amount of liquid in the conduit to pass to the outlet.

12. The system of claim 1, further comprising an additive reservoir, wherein the processor is configured to identify whether an amount of additive in the additive reservoir is sufficient to mix with the first amount of liquid in the container at a predetermined ratio.

13. The system of claim 1, further comprising a pump, the pump fluidly coupled to the outlet, the pump configured to draw the second amount of liquid in the conduit through the outlet when the valve is selected to allow the second amount of liquid in the conduit to pass to the outlet, the sensor configured to detect when the pump has completed drawing the second amount of liquid in the conduit through the outlet when the valve is selected to allow the second amount of liquid in the conduit to pass to the outlet.

14. The system of claim 1, wherein the valve is selectable to have the container in fluid communication with the outlet thereby allowing liquid within the container to pass to the outlet.

15. The system of claim 14, wherein the outlet is fluidly coupled to a liquid consumption device.

16. The system of claim 1, wherein the conduit further comprises a level sensor configured to detect a level of the liquid within the conduit.

17. The system of claim 1, wherein the conduit further comprises a plurality of level sensors configured to detect a plurality of levels of the liquid within the conduit.

18. A method of sensing a first amount of a liquid in a container comprising:

providing: a container configured to hold the liquid; a conduit having a length positioned relative to a portion of the container where a level of the liquid in the container changes when liquid is added to the container or liquid is removed from the container, the conduit in fluid communication with the container thereby allowing a second amount of the liquid to enter the conduit that is proportional to the first amount of the liquid in the container; an outlet; and a valve in fluid communication with the conduit and the outlet, wherein the valve is selectable to allow the second amount of liquid in the conduit to pass to the outlet, the second amount of liquid passing to the outlet being proportional to the first amount of the liquid in the container;

selecting with the valve to allow the second amount of liquid in the conduit to pass to the outlet;

measuring the second amount of liquid in the conduit passing through the outlet; and determining the first amount of the liquid in the container based on the measured second amount of liquid passing through the outlet.

\* \* \* \* \*